United States Patent
Rothschild

(10) Patent No.: US 9,466,078 B2
(45) Date of Patent: *Oct. 11, 2016

(54) SYSTEMS AND METHODS FOR INDICATING THE EXISTENCE OF ACCESSIBLE INFORMATION PERTAINING TO ARTICLES OF COMMERCE

(71) Applicant: Leigh M. Rothschild, Miami, FL (US)

(72) Inventor: Leigh M. Rothschild, Miami, FL (US)

(73) Assignee: SCANNING TECHNOLOGIES INNOVATIONS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,817

(22) Filed: Jun. 5, 2015

(65) Prior Publication Data

US 2015/0379592 A1 Dec. 31, 2015

Related U.S. Application Data

(63) Continuation of application No. 14/294,800, filed on Jun. 3, 2014, now Pat. No. 9,053,498, which is a continuation of application No. 13/922,888, filed on Jun. 20, 2013, now Pat. No. 8,746,560, which is a continuation of application No. 13/405,246, filed on Feb. 25, 2012, now Pat. No. 8,469,270.

(51) Int. Cl.
| | |
|---|---|
| G06F 17/00 | (2006.01) |
| G06F 19/00 | (2011.01) |
| G06K 7/00 | (2006.01) |
| G06Q 30/00 | (2012.01) |
| G06Q 40/00 | (2012.01) |
| G06Q 30/02 | (2012.01) |
| G06F 17/30 | (2006.01) |
| G06F 17/22 | (2006.01) |

(52) U.S. Cl.
CPC ....... *G06Q 30/0281* (2013.01); *G06F 17/2235* (2013.01); *G06F 17/30312* (2013.01); *G06F 17/30699* (2013.01); *G06Q 30/02* (2013.01); *G06Q 30/0251* (2013.01)

(58) Field of Classification Search
CPC .............. G06Q 30/0281; G06Q 30/0251; G06Q 30/02; G06F 17/2235; G06F 17/30699; G06F 17/30879
USPC ......................................... 235/385
See application file for complete search history.

(56) References Cited

U.S. PATENT DOCUMENTS

| | | | |
|---|---|---|---|
| 8,469,270 B1 * | 6/2013 | Rothschild ........ | G06F 17/30312 235/375 |
| 8,746,560 B2 * | 6/2014 | Rothschild ........ | G06F 17/30312 235/375 |
| 9,053,498 B2 * | 6/2015 | Rothschild ........ | G06F 17/30312 |

* cited by examiner

*Primary Examiner* — Laura Gudorf

(57) ABSTRACT

A system and method are provided for indicating an existence of a link to information pertaining to an article of commerce. The present disclosure provides for downloading a look-up table from a server database to a mobile device via a communication network. The look-up table is configured to store a plurality of UPC numbers associated with a plurality of articles of commerce and a plurality of information link indicators. Each information link indicator is associated with a respective UPC number and article of commerce and indicates the existence of a link via the communication network to information pertaining to the respective article of commerce. The mobile device allows a consumer to immediately determine if product information is available for a particular article of commerce, via a visual or audible indication on the mobile device, without access to the communication network.

16 Claims, 4 Drawing Sheets

SYSTEMS AND METHODS FOR INDICATING THE EXISTENCE OF ACCESSIBLE INFORMATION PERTAINING TO ARTICLES OF COMMERCE

CROSS-REFERENCE TO RELATED APPLICATIONS

The present application claims priority under the laws and rules of the United States, including 35 USC §120, as a continuation patent application to U.S. patent application Ser. No. 14/294,800 filed on Jun. 3, 2014 which in turn claims priority under the laws and rules of the United States, including 35 USC §120 to U.S. patent application Ser. No. 13/922,888 filed on Jun. 20, 2013, now U.S. Pat. No. 8,746,560 which in turn claims priority under the laws and rules of the United States, including 35 USC §120 to U.S. patent application Ser. No. 13/405,246 filed on Feb. 25, 2012, now U.S. Pat. No. 8,469,270. The contents of U.S. patent application Ser. Nos. 14/294,800, 13/922,888, and 13/405,246 as well as U.S. Pat. Nos. 8,746,560 and 8,469,270 are herein incorporated by reference in their entireties.

BACKGROUND

1. Field

The present disclosure relates generally to mobile devices, and more particularly, to systems and methods for enabling a mobile device to indicate the existence of accessible information about an identified article of commerce.

2. Description of the Related Art

Portable digital devices are now common. Examples include the various Windows™ Pocket PC devices which have an operating system created by Microsoft Corporation of Redmond, Wash. Other devices include various mobile phone devices including many that have built-in camera imaging devices. Still other portable digital devices include portable media players from Creative Media of Singapore, Samsung of South Korea, Archos, Inc. of Irvine, Calif. and Apple Computers, Inc. of Cupertino, Calif. Additionally, Sony of New York and Japan manufacture a portable game playing device called the Sony PSP™ (PlayStation Portable).

Increasingly, many of these portable media devices include a means of transmitting and receiving digital content. Various communications technologies are frequently built into these devices. Examples of portable communicating devices include mobile phones which employ GSM, CDMA, W-CDMA, and FOMA technology, among other standards, to send and receive data in addition to handling voice communications. Many of the portable media devices also include transmission capabilities including Wi-Fi (IEEE 802.11a, b, g and x among others), Bluetooth™, infrared, etc., to allow the user to transmit and receive digital content. The Sony PSP™ device, for example, includes Wi-Fi (i.e., IEEE 802.11b) to transmit and receive digital data.

The above-described mobile devices may employ an incorporated imaging device to scan Universal Product Codes (UPCs) or other symbologies disposed on articles of commerce to receive more information on such articles. The mobile devices use a communication means to access the Internet to receive such information. However, these devices take time to connect to the Internet (if Internet service is even available) and then the user still may or may not have information on the article of commerce. If the user takes two or three minutes to scan and connect and then information is not available, it is frustrating to the user. In this age of 'instant gratification and information', a need exists for a system and method to allow a consumer to determine whether or not information pertaining to an identified article of commerce may be obtained. Also, a need exists to allow a consumer to determine whether this information is accessible while the consumer is on the go. A further need exists for a mobile device to allow a consumer offline access to immediately determine if product information is available for a particular article of commerce, via a visual or audible indication on the mobile device.

SUMMARY

A system and method are provided for indicating an existence of a link to information about an article of commerce. According to one embodiment, a system comprises, among other things, a mobile device having a communication interface configured to enable the mobile device to communicate with a communication network. The mobile device further comprises a signal processing device and a visual input device. The system also includes a local database associated with the mobile device, wherein the local database is configured to store data for use by the mobile device. Also included is a server in communication with the communication network, the server comprising a server database configured to store a look-up table that stores a plurality of Universal Product Codes (UPCs) associated with a plurality of articles of commerce. The look-up table also stores a plurality of information link indicators. Each information link indicator is associated with a respective UPC and article of commerce and indicates the existence of a link to information about the respective article of commerce via the communication network. The mobile device is configured to download the look-up table from the server database and store the look-up table in the local database. The visual input device is configured to scan a UPC symbol from an article of commerce and forward scanned data to the signal processing device. In response to receiving the scanned data, the signal processing device is configured to look up the UPC in the look-up table stored in the local database to determine from the respective information link indicator whether or not a link to information about an article of commerce associated with the scanned UPC symbol is accessible via the communication network.

A method is also provided for indicating an existence of a link to information about an article of commerce, according to another embodiment. The method comprises downloading a look-up table from a server database via a communication network. The look-up table is configured to store a plurality of UPCs associated with a plurality of articles of commerce. The look-up table also stores a plurality of information link indicators, where each information link indicator is associated with a respective UPC and article of commerce, and each information link indicator indicates the existence of a link to information about the respective article of commerce via the communication network. The method also includes storing the downloaded look-up table in a local database associated with a mobile device. The method then includes scanning a UPC symbol from an article of commerce and looking up the UPC in the look-up table stored in the local database to determine from the respective information link indicator whether or not a link to information about an article of commerce associated with the scanned UPC symbol is accessible via the communication network.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1A:
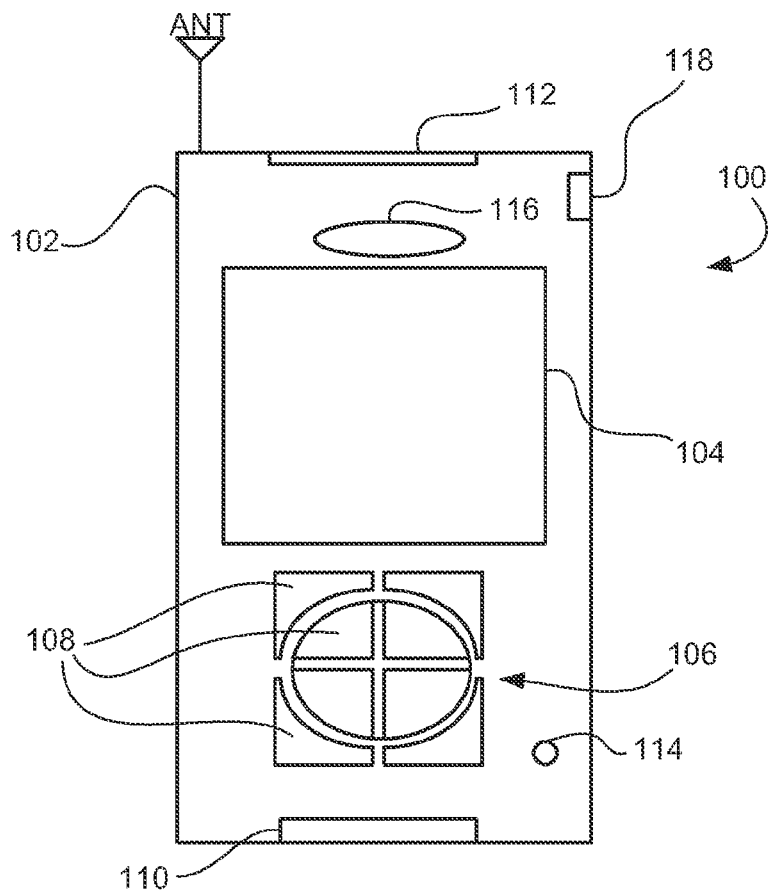
FIG. 1A is front view of a mobile device according to an embodiment of the present disclosure.

Preferred embodiments of the present disclosure will be described hereinbelow with reference to the accompanying drawings. In the following description, well-known functions or constructions may not be described in detail to avoid obscuring the present disclosure in unnecessary detail.

Many types of portable devices are able to access web pages from the Internet. Some may gain access through a Wi-Fi network, while others may use cellular service to access the mobile web. However, since these portable devices typically use some type of wireless communication, interruptions of service may arise due to regions where cellular service is not available or is being blocked and/or where Wi-Fi hotspots are out of range. Also, certain places may be categorized as non-cellular locations, such as on airplanes, ships, trains, etc., due to being out of range or due to blockage for the purpose of avoiding disruption with more critical communication systems.

In addition to advancements in wireless communication, advancements in the technology of memory devices should also be considered. With respect to memory devices, improvements have been made to reduce the form factor such that large amounts of data can be stored in a relatively small space. Some small memory components are able to store up to 128 gigabytes. It is believed that in the near future memory components of the same size may be capable of storing several terabytes of data. As suggested in the present disclosure, mobile devices may have a storage capacity of hundreds of gigabytes or even more in the near future. With this capacity, a mobile device having Internet access may download information from an Internet-connected server and store a large amount of data locally. Then, regardless of whether or not the mobile device has Internet access, the user may still obtain information that had been previously stored during the download.

In particular, information that mobile devices may be able to download from a server may be related to any type of products, such as clothing, DVDs, groceries, etc. The information may be organized in a look-up table, for example, and contain information that identifies the articles of commerce based on a Universal Product Code (UPC) number and associated bar code symbol. Using a scanner or image capture device on the mobile device, the user can scan a UPC bar code and the mobile device, with decoding software, may be able to decode the bar code. From the stored information, an article of commerce may be identified using the UPC.

Not only this, but the information downloaded from the server may also include an information link indicator. According to the embodiments disclosed herein, an information link indicator may be an indication (for the user's reference) as to whether (or not) information about the identified article of commerce can be accessed over the Internet (or other network). The information link indicator may be a status or check signal indicating that information is available. Some information may be available by conducting a search on the network, while other information may be included in the look-up table or other form of data on the memory device of the mobile device. The information link indicator may also include an indication as to whether a particular link to one or more web pages exists, where the particular link might be stored along with the information link indicator in the look-up table.

Since a typical look-up table does not require a large amount of memory, the look-up table(s) of the present disclosure may include UPC data, product name data, and an associated information link indicator for practically every product associated with a known UPC in the entire world. In some embodiments, one or more look-up tables may be created for certain categories of products. In addition to the UPC data, a small amount of information about the articles of commerce may also be stored in the look-up tables.

In operation of the system and method of the present disclosure, the portable device may use any suitable communication protocols including but not limited to Wi-Fi (a, b, c d, n, x), cellular communications such as GSM, CDMA, FOMA, etc., infrared communications, cabled communications, Bluetooth communications, satellite communications, etc., to transmit a request to a remote server on the global computer network (GCN), e.g., the Internet. The request, according to some implementations, may be an initial request to download a look-up table from the server, where the look-up table includes information relating UPC numbers with the associated articles of commerce and the information link indicator, as described above. In some embodiments, the request may be a request for a certain category of articles of commerce, e.g., categories of articles that have been previously identified as being of interest to the user. After an initial download, the request may also represent a request to receive any updates made to the look-up table since the latest download. In some embodiments, the user may also transmit information identifying the user submitting the request.

The server may then use any suitable computer processing power and software to retrieve the requested look-up table(s). The server may then use standard communications protocols to transmit information back to the portable digital device. With the look-up table(s) stored in local memory on the user's mobile device, the user may access the information on the table at any time without the need to continually access information from the server. The information may be used to inform the user as to whether any article of commerce, which is identified by the mobile device thereafter, is associated with accessible information that describes certain details about the respective article. The description of the articles of commerce may include characteristics of the articles, prices of the articles, stores where the articles are available for purchase, or other features of the articles.

After the look-up table has been downloaded onto the user's portable digital device, the user may then locate an article of commerce, such as a book, electronic device, article of clothing, etc. The user utilizes the portable digital device, e.g., a mobile phone or other mobile device, to identify the article of commerce. Several possible solutions are provided to allow the article to be identified by a user. For example, the article of commerce may be identified by using a scanning device on the mobile device that scans a barcode on the article or by using an image capture device containing a CCD device (e.g., a camera) where the user takes a picture of the barcode on the article of commerce. The article may also be identified using a device containing a user interface allowing user keyboard input where the user inputs the name of the item into the portable device, or a device where the user may speak the name of the article of commerce into the portable device where the device contains voice recognition software, etc.

Referring to FIG. 1A, a mobile device 100, such as a portable media playback device or other portable digital device for receiving and playing various types of digital media content, e.g., audio, video, images, games, text, multimedia content, etc., in accordance with an embodiment of the present disclosure, is illustrated. The mobile device 100 includes various electrical components, which will be described in detail below, disposed in a generally rectangular housing 102. A display module 104 is provided for displaying video and image media content, such as movies, animations, etc., and a speaker 116 is provided configured to produce audio, e.g., music or a soundtrack associated with a video. An audio port 118 may be configured to receive a plug or connector from a headphone, stereo system, etc., to stream the audio to the connected device. It is to be appreciated that when an external device is connected to the audio port 118 the speaker 116 will be disabled. Input module 106 includes a plurality of buttons 108 for inputting data and navigating through a plurality of menus. A touch screen overlaid upon the display module 104 may also be coupled to the input module for facilitating user input. The mobile device 100 further includes a storage module 110 for storing a plurality of content and a transmission module 112 for transmitting/receiving data and/or content to another device, e.g., a personal computer, a personal digital assistant (PDA), a server residing on the Internet, etc. Optionally, the media device 100 may include a microphone 114 for acquiring audio from the user of the device to input data.

Figure 2:
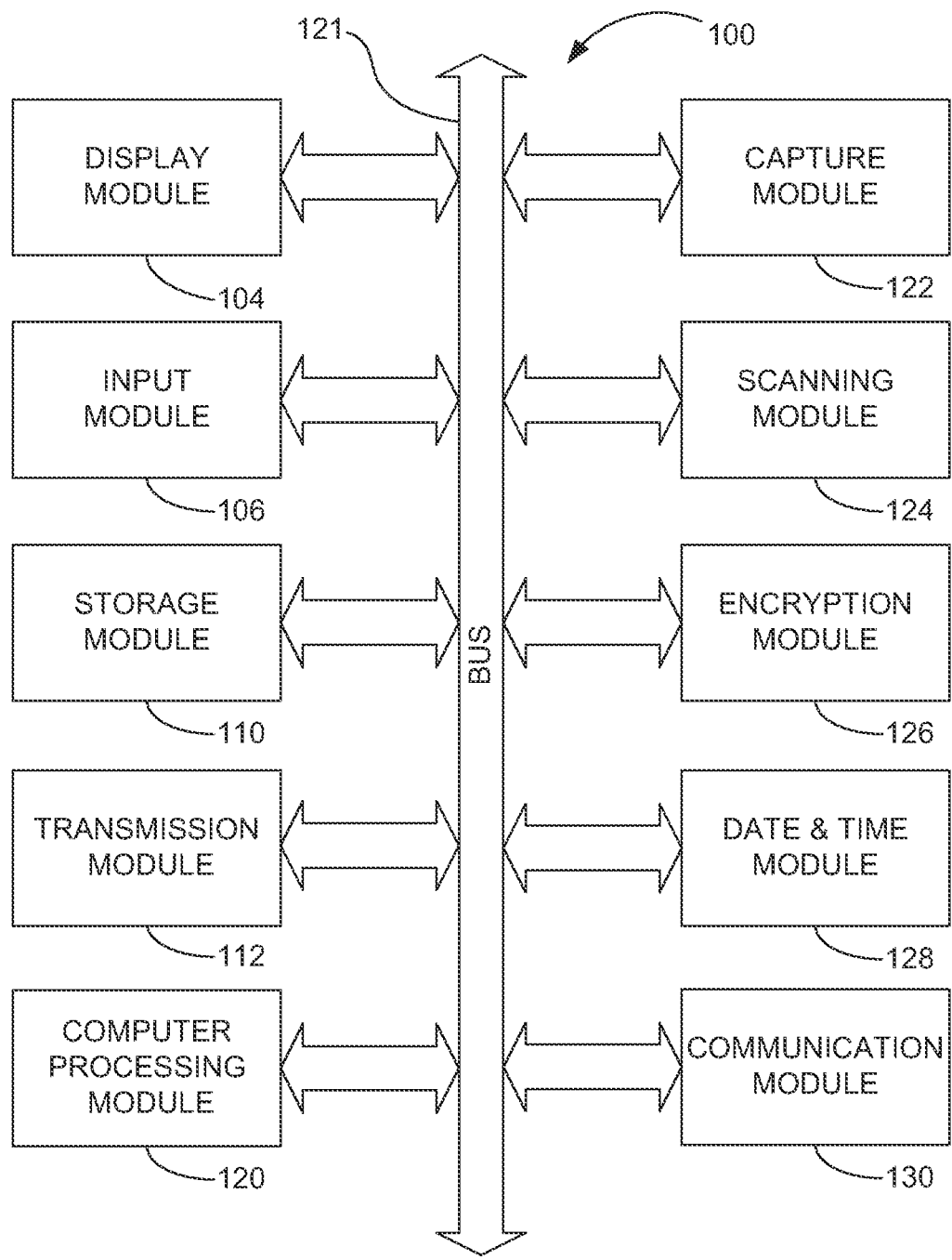
FIG. 2 is a block diagram of various modules included in the mobile device illustrated in FIG. 1.

Referring to FIG. 2, various components of the mobile device 100 are described. The mobile device 100 contains a computer processing module 120, e.g., a microprocessor. The computer processing module 120 may use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The mobile device 100 also includes an operating system and micro instruction code preferably residing in read only memory (ROM) (not shown). The various processes and functions described herein may either be part of the micro instruction code or part of an application program (or a combination thereof) which is executed via the operating system. Exemplary operating systems include but are not limited to Apple iOS, SymbianOS, Windows Mobile/Windows CE, Palm OS, Linux, Blackberry OS, BREW, etc., which have been developed for mobile computing applications and can handle both data computing and communication applications, e.g., voice communications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 120 may further include, in addition to a microprocessor, a digital signal processor (DSP) for decoding stored audio, video and photo files to be played on the mobile device 100. As is known in the art, the DSP may include several known decompression algorithms for decompressing stored media content, e.g., a MP3 file. The device 100 of the present disclosure may support any of various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The device 100 also contains a display module 104 for displaying digital information such as video files, image files, text files, etc. This display may be in any current form in the art, including Liquid Crystal Displays (LCD), Light emitting diode displays (LED), Cathode Ray Tube Displays (CRT) or any other type of display currently existing or existing in the future. The display module 104 may also include an audio output device, e.g., a speaker 116, audio port 118, etc., allowing the user to also hear audio output from the device 100, e.g., audio associated with a video, a MP3 file, etc.

The device 100 of the present disclosure may contain a user input module 106 to either receive user instructions via text input by the way of buttons 108, a standard keyboard interface coupled to the device, or a character recognition capture device which translates user text input into alphanumeric characters. In some embodiments, the character recognition device may include a touch screen which overlays the display module 104 such that text may be entered via a pen-like stylus or other instrument. Such input devices are standard and currently available on many electronic devices including portable digital assistants (PDAs) and cellular telephones. Optionally, microphone 114 may be further coupled to the input module 106 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user may utilize the user input module 106 to enter various data, e.g., to initiate communication with a remote server, to request information from the server, etc.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future.

The transmission module 112 will enable the device 100 to transmit or transfer information to other computing devices and to receive information from other computing devices, e.g., digital media files, codes to unlock downloaded media, encryption/decryption keys, etc. The transmission module 112 will perform its functionality by hardwired and/or wireless connectivity. The hardwire connection may include but is not limited to hard wire cabling, e.g., parallel or serial cables, USB cable, Firewire (1394 connectivity) cables, and the appropriate port. The wireless connection may operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. The transmission module 112 may compress and encode the encrypted information for transmission using any known wireless communication technology. In one embodiment, antenna ANT is coupled to the transmission module 112 for extending the wireless transmission range of the device 100.

Figure 1B:
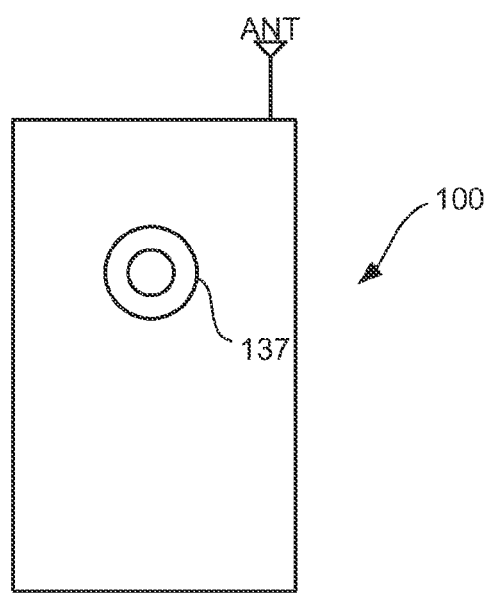
FIG. 1B is a rear view of the mobile device of FIG. 1A.

A capture module 122 is provided to capture an image desired by the user in digital form, e.g., an image of an article of commerce, a barcode, etc. The capture module 122 may include an image sensor, an analog-to-digital (A/D) converter and a digital signal processor (DSP). Referring to FIG. 1B when a user desires to capture an image, a lens 137 disposed on a rear side of the mobile device 100 is aimed at a subject of the image and is used in conjunction with display module 104 for positioning a subject of the image in lieu of a viewfinder. Light is allowed to enter through the lens 137 and shine on the image sensor, e.g., a charge-coupled device (CCD) or complimentary metal-oxide semiconductor (CMOS). The image sensor may include millions of photosensors, e.g., pixels, wherein each pixel absorbs the light and transforms the light into an electric charge proportional to the intensity of light. Each charge can be transmitted to an A/D converter where the charge is converted into a digital value representing the color the pixel will be, e.g., representing different intensities of red, green and blue. The digital values are then passed to the digital signal processor which may enhance the image, compress it, and then stores it in a digital file format in the storage module 110.

In other embodiments, the mobile device 100 further includes an integrated scanning module 124 for scanning a barcode or other symbology on an article of commerce. The scanning module 124 may contain a light source, e.g., LED, and photocell coupled to the computer processing module 120, or alternatively, may include a separate decoder engine that will decode the data received by the photocell before sending it to the computer processing module 120. Knowledge of the art reveals that many different types of scanners currently exist and the inventor realizes that the type of scanner would depend upon the type symbology that is utilized in the printed images. The symbology may be in any form currently practiced in the art, including barcodes (e.g., UPC, EAN, PDF417, etc.), photosymbols, standard or specialized text, etc., or any future type of symbology.

It is to be appreciated that the capture module 122 may also be used in conjunction with the scanning module 124 to read symbology associated with an article of commerce. Here, the capture module 122 may acquire an image of the symbology and the scanning module 124 may further include a digital signal processor executing an algorithm for deciphering or decoding the symbology from the captured image. The use of an image sensor to read symbology, e.g., a barcode, is known in the art and systems employing such technology, for example, are commercially available from Symbol Technologies of New York.

The mobile device 100 may also include an encryption module 126. The encryption module 126 may use conventional code encryption algorithms currently in use or that may be uses in the future such as symmetric-key algorithms, e.g., DES, Triple-DES, Blowfish, RC2, RC4, RC5, etc., and asymmetric-key algorithms, e.g., Diffie-Hellman, RSA, ElGamal, etc. to decrypt locked digital media content files that are stored in the storage module 110. The encryption module 126 may also encrypt payment information of a user before the payment information is transmitted to another device or server.

Furthermore, the mobile device 100 may also include a date and time module 128. The date and time module 128 uses standard computer chip processing technology widely in use, e.g., a crystal, or alternatively, input from a GPS receiver to supply the date and time.

In one embodiment, the device 100 according to the principles of the present disclosure is embodied as a mobile phone including the modules and architecture illustrated in FIG. 2. In this embodiment, microphone 106 is further coupled to a communication module 130 for encoding a user's speech to be transmitted via antenna ANT using CDMA, PCS, GSM or any other known wireless communication technology. The user will enter phone numbers to be dialed via the touch screen, or alternatively, as is known in the mobile phone art, the device 100 may include a full QWERTY keyboard as an input module to enter text information. In addition to producing audio from audio or multimedia content, speaker 116 will be coupled to the antenna ANT and a decoder for receiving and decoding voice communication from another mobile phone.

It is to be appreciated that the communication module 130 may include a single integrated circuit chip to perform data transfer and voice communications or a single module including a separate data transfer chip, e.g., a WiFi transceiver, and a separate voice communication chip, e.g., a CDMA chip. In one embodiment, the communication module will operate on the wireless GPRS (General Packet Radio Service) data protocol or a 3G or 4G protocol such as W-CDMA, CDMA2000 and TD-SCDMA. The GPRS, 3G, and 4G protocols have the ability to carry both voice and data over the same service.

It is to be appreciated that the device 100 described above is an exemplary device and may include all or a portion of the modules described above. Furthermore, it is to be appreciated that existing mobile devices, e.g., mobile phones, digital media playback device, may be used in accordance with the principles of the system and method of the present disclosure described below.

Figure 3:
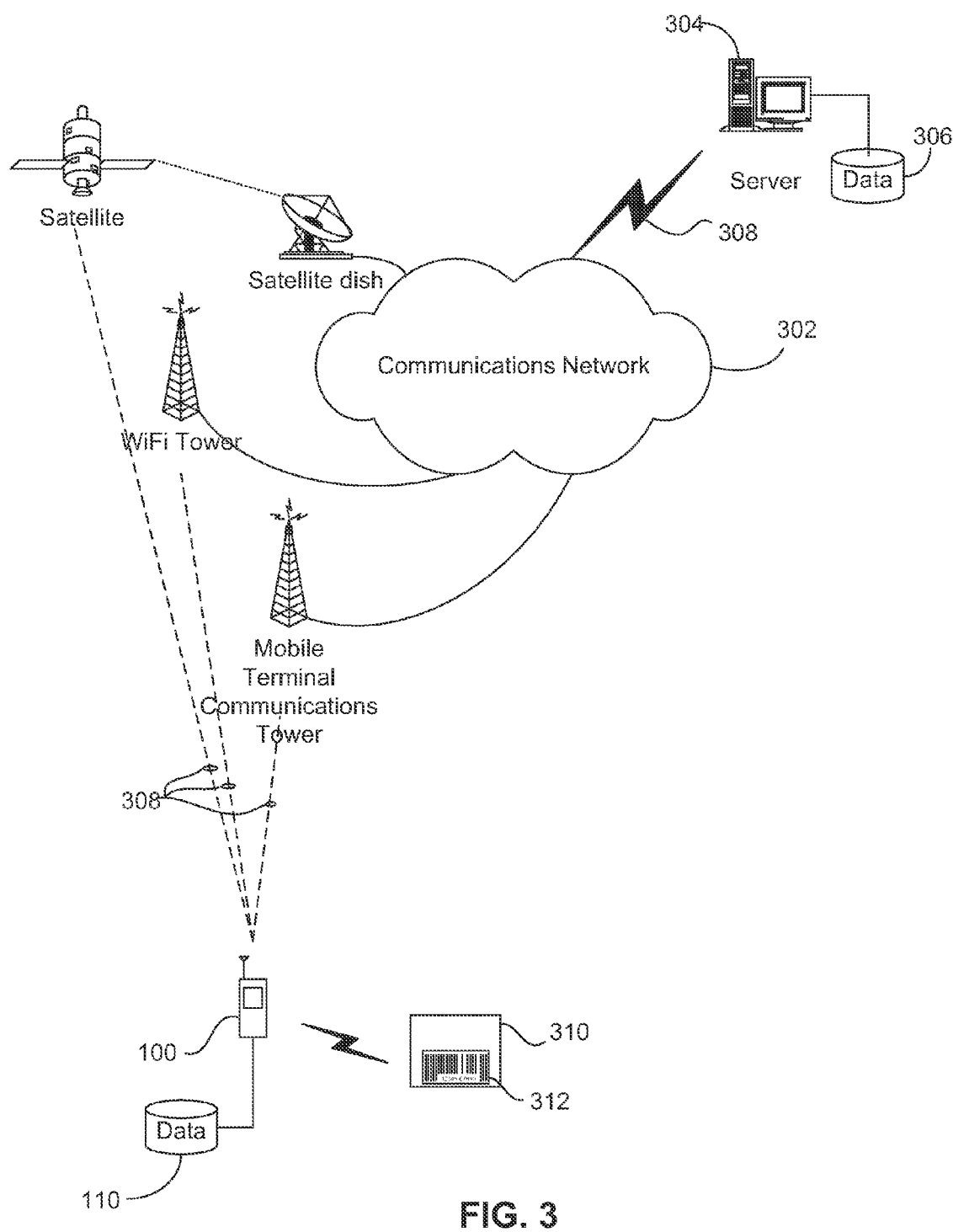
FIG. 3 illustrates a system for enabling remote communication between devices via a communication network.

Systems and methods are provided herein for identifying an article of commerce and providing an indication as to whether or not a link to information pertaining to the article exists, which is described below in relation to FIGS. 3 and 4. Referring to FIG. 3, a system in accordance with the present disclosure is illustrated. The system includes a mobile device 100 as described above. Associated with the mobile device 100 is a database 110, which may be stored within one or more memory devices. The memory devices may include memory that is internal to the mobile device 100 (e.g., storage module 110) and/or memory that is connected to the mobile device 100 in an external arrangement, such as being removably connected to the device 100 or in communication via a wired connection.

The mobile device 100 communicates to a server 304 via a communication network 302. The device 100 and server 304 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11a/b/g), etc. It is to be appreciated that the network 302 may be a local area network (LAN), wide area network (WAN), the Internet or any known network that couples a plurality of computers to enable various modes of communication via network messages. Furthermore, the server 304 may communicate using the various known protocols such as Transmission Control Protocol/Internet Protocol (TCP/IP), File Transfer Protocol (FTP), Hypertext Transfer Protocol (HTTP), etc., and secure protocols such as Internet Protocol Security Protocol (IPSec), Point-to-Point Tunneling Protocol (PPTP), Secure Sockets Layer (SSL) Protocol, etc. The server 304 further includes a storage medium 306 for storing a database, which includes, among other things, one or more look-up tables that provide links between articles of commerce and their corresponding UPC number and that also provide links between the UPC number and information link indicators, where each information link indicator is intended to indicate whether or not information pertaining to the respective article of commerce is accessible over the communications network 302. In some embodiments, the look-up table(s) may further include hyperlinks including address information for enabling a browser to contact one or more web pages that provide the information pertaining to the article. According to other implementations, the look-up table(s) may further contain the actual information pertaining to the article or at least a portion of the information or a summary of the information. For example, the look-up table may include a description of the article and/or advertising content relating to the particular article.

Figure 4A:
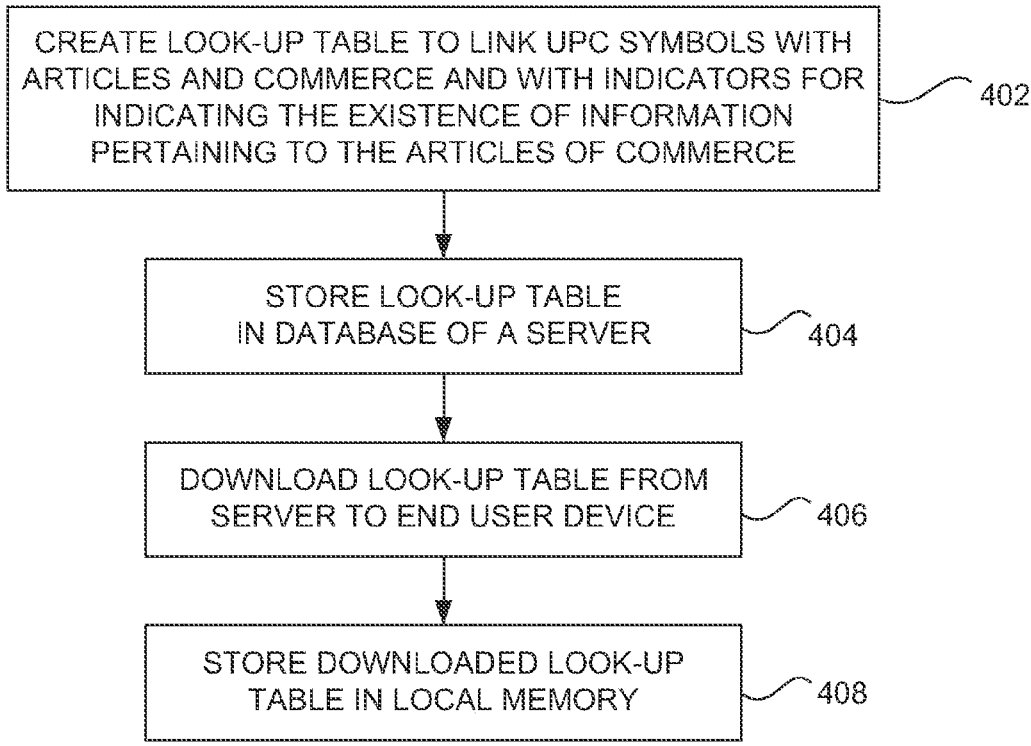
FIGS. 4A and 4B are flow diagrams illustrating methods for indicating the existence of a link to information pertaining to an article of commerce, according to several embodiments of the present disclosure.

FIG. 4A is a block diagram illustrating a method for downloading a look-up table that may be used to indicate the existence of links to information about an article of commerce. In this embodiment, the method includes, at shown in block 402, the step of creating a look-up table to link UPC symbols with articles of commerce. The look-up table is configured to store a plurality of UPCs associated with a plurality of articles of commerce and further configured to store a plurality of information link indicators, each information link indicator associated with a respective UPC and article of commerce. Each information link indicator indicates the existence of a link to information pertaining to the respective article of commerce, the link being made to the information via the communication network.

Block 404 indicates that the look-up table is stored in a database of a server that is accessible over the communication network. As indicated in block 406, the look-up table is downloaded from the server to an end user device. The table may be downloaded to any number of remote user devices, such as the mobile device 100 described above. Once downloaded, the look-up table is stored in local memory (step 408), such as on a storage device on a mobile device. In some embodiments, the look-up table may be less than about 10 Gbytes, allowing the mobile device or other devices that download the table to easily handle the storage capacity.

The method of FIG. 4A may further include the step of automatically downloading periodic updates of the look-up table from the server database to the local database. This process of periodically downloading updates allows any modification in the data in the table to be distributed to the mobile devices that have initially downloaded the look-up table.

Figure 4B:
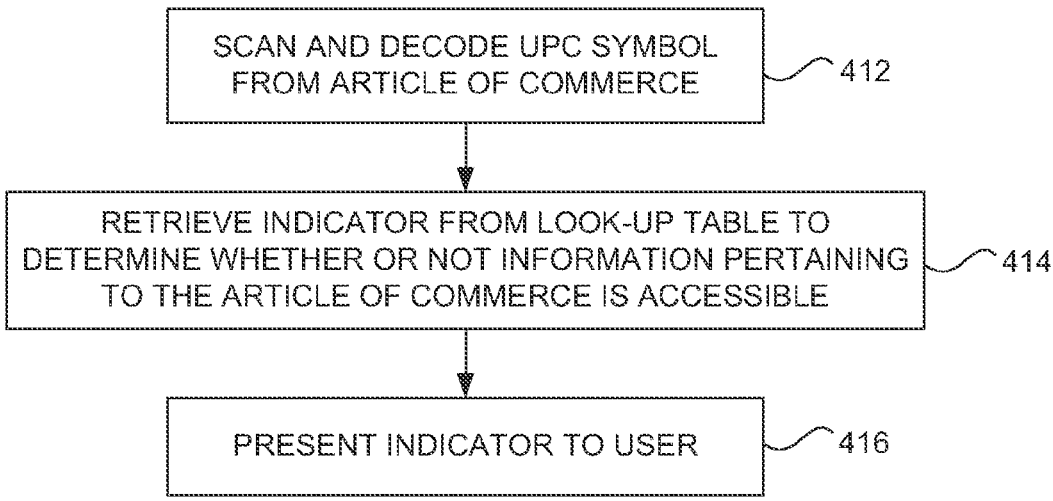

FIG. 4B illustrates a method, which, according to some embodiments, is performed after the downloading steps of FIG. 4A. The method describes steps that enable a user device, such as a mobile device, having downloaded the look-up table, to indicate an existence of a link to information about an article of commerce. According to block 412, the method includes scanning and decoding a UPC symbol from an article of commerce. Block 414 comprises retrieving an indicator from the look-up table, which essentially involves looking up the UPC in the look-up table stored in the local database to determine from the respective information link indicator whether or not a link to information pertaining to the article of commerce associated with the scanned UPC symbol is accessible via the communication network.

In some embodiments, the method may further comprise the step of displaying the indicator to the user, as indicated in block 416, which essentially involves producing visual signals to indicate to a user of the mobile device whether or not the scanned UPC symbol is associated with an article of commerce for which information regarding the article of commerce is accessible via the communication network. Instead of or in addition to the visual signal, audio signals may also be produced, for example, producing a beep or tone after scanning to indicate a link is available. It should be noted that the step of automatically downloading the periodic updates, as mentioned above, would normally precede the steps of looking up the UPC and related information in the look-up table.

Referring back to FIG. 3, the mobile device 100 uses communication protocols including but not limited to Wi-Fi (a, b, c d, n, x), mobile phone communications such as GSM, CDMA, FOMA, etc, infrared communications, cabled communications, Bluetooth communications, satellite communications, to request to download a look-up table from the server 304. It is to be appreciated the device 100 may use any one or a combination of protocols to transmit the request to the server 304. For example, the device 100 may employ a telecommunication protocol to transmit the request via the communication module 140.

Upon receipt of a request from an end user, the server 304 retrieves the look-up table from its database 306. According to various implementations, the server 304 may store a single look-up table including every known UPC-related article of commerce, or may store multiple look-up tables in which each table represents a specific category of articles of commerce. For example, one user may have interests in musical instruments and cooking items, but no particular interests in automobiles and power tools. In this respect, a group of look-up tables that represent a user's interests may be retrieved or just a portion of a single catch-all look-up table may be retrieved.

When the server 304 retrieves the single look-up table, or, in alternative embodiments, one or more look-up tables that are divided into categories or that represent a portion of a larger table, the look-up table(s) are downloaded to the end user device, e.g., the mobile device 100. The mobile device 100 then stores the look-up table(s) in memory (e.g., database 110) for later use. In some implementations, the server 304 and mobile device 100 may institute an automatic download arrangement where updates to the look-up table are automatically downloaded to the mobile device 100. Automatic downloads may occur on a periodic basis and/or when the data in the look-up table has been changed by a certain amount.

Once the mobile device 100 stores the look-up table locally, the mobile device 100 may be used to indicate if information is available for various articles of commerce. Also, these actions of accessing the data in the look-up table may be done without the involvement of further communications with the server 304. In this way, the user may be able to quickly find out whether information is accessible for any number of products. As shown in FIG. 3, an example of an article of commerce 310 includes a barcode 312. The device 100 is capable of scanning the barcode 312 with the scanning module 124 and decoding the barcode to acquire an identification code of the article. Alternatively, the device 100 will capture an image of the barcode 312 using the capture module 122 and decode the barcode 312 to acquire an identification code of the article. Furthermore, the user can also take a picture of the article of commerce via the capture module 122. Then using standard and existing computer processing power and software solutions such as Attrasoft Image recognition software, or optical character recognition software (OCR software such as OmniPage or ReadIris) the image or name of the article of commerce is decoded and the identity of the article of commerce is resolved. The processing module 120 then uses the decoded identity to determine from the look-up table if information is available for the article. If information is available, the mobile device 100 will provide a visual or audible indication to the user. Alternatively, if no information is available, the mobile device 100 will provide a different visual or audible indication. By employing the techniques of the present disclosure, a consumer or user can quickly determine the status of an article of commerce, i.e., whether further information is available or not, without communication capabilities, e.g., not being connected to the Internet.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A system for indicating an existence of a link to information pertaining to an article of commerce, the system comprising:
   a mobile device comprising a portable handheld housing and a communication interface configured to enable the mobile device to communicate with a communication network, the mobile device further comprising a signal processing device and a visual input device, the visual input device affixed within the portable handheld housing;
   digital files associated with the mobile device,
   a server in communication with the communication network, the server comprising a server database configured to store a look-up table that includes at least a plurality of identification codes associated with a plurality of articles of commerce, the look-up table also storing a plurality of information link indicators, each information link indicator associated with a respective identification code and article of commerce, and each information link indicator being configured as a status signal indicating the existence or absence of a link to information pertaining to a respective article of commerce, the link being made to the information via the communication network;
   wherein the visual input device is configured to capture an image of an article of commerce and decode the image to obtain an identification code;
   wherein, in response to receiving the identification code, the signal processing device is configured to look up the identification code in the look-up table to determine from a respective information link indicator whether or not a link exists for accessing information pertaining to an article of commerce associated with the identification code via the communication network, wherein the signal processing device determines whether or not the link exists without accessing the communication network.

2. The system of claim 1, wherein the mobile device further comprises a visual output device for producing visual signals to indicate to a user of the mobile device whether or not the image is associated with an article of commerce for which information pertaining to the article of commerce is accessible via the communication network.

3. The system of claim 1, wherein the mobile device further comprises an audio output device for producing audio signals to indicate to a user of the mobile device whether or not the image is associated with an article of commerce for which information pertaining to the article of commerce is accessible via the communication network.

4. The system of claim 1, wherein the look-up table further comprises hyperlinks enabling the communication interface to access information about the respective article of commerce from at least one web page via the communication network.

5. The system of claim 1, wherein the communication interface is configured to automatically receive periodic updates from the server for updating the look-up table.

6. The system of claim 1, wherein the look-up table is further configured to store at least one of descriptions of the plurality of articles of commerce and advertisement content regarding the plurality of articles of commerce.

7. A method for indicating an existence of a link to information pertaining to an article of commerce, the method comprising:
   downloading a look-up table from a server database via a communication network, wherein the look-up table is configured to store a plurality of identification codes associated with a plurality of articles of commerce, the look-up table also storing a plurality of information link indicators, each information link indicator associated with a respective identification code and article of commerce, and each information link indicator being configured as a status signal indicating the existence or absence of a link to information pertaining to a respective article of commerce, the link being made to the information via the communication network wherein downloading and storing the look-up table is performed when the mobile device is not being used for voice communication;
   capturing an image associated with an article of commerce using a visual input device of the mobile device;
   decoding the image to obtain an identification code; and
   looking up the identification code in the look-up table to determine from a respective information link indicator whether or not information pertaining to the article of commerce associated with the identification code is accessible via the communication network, wherein looking up the identification code to determine whether or not the information is accessible is performed without accessing the communication network.

8. The method of claim 7, further comprising the step of producing visual signals to indicate to a user of the mobile device whether or not the image is associated with an article of commerce for which information pertaining to the article of commerce is accessible via the communication network.

9. The method of claim 7, further comprising the step of producing audio signals to indicate to a user of the mobile device whether or not the image is associated with an article of commerce for which information pertaining to the article of commerce is accessible via the communication network.

10. The method of claim 7, further comprising the step of automatically downloading periodic updates of the look-up table from the server database.

11. The method of claim 7, wherein the look-up table further comprises hyperlinks enabling access to information about the respective article of commerce from at least one web page via the communication network.

12. A mobile device for indicating an existence of a link to information pertaining to an article of commerce, the mobile device comprising:
   a portable handheld housing;
   a communication interface configured to communicate with a communication network;
   an input device configured to receive identifying information pertaining to an article of commerce;
   a processing device configured to determine the article of commerce based on the identifying information; and
   wherein the communication interface is configured to download a look-up table from a server database and store the look-up table when the mobile device is not being used for voice communication, the look-up table includes at least a plurality of identification codes associated with a plurality of articles of commerce, the look-up table also stores a plurality of information link indicators, each information link indicator associated with a respective identification code and article of commerce, and each information link indicator being configured as a status signal indicating the existence or absence of a link to information pertaining to a respective article of commerce, the link being made to the information via the communication network;
   wherein the input device is configured to capture an image of an article of commerce and decode the image to obtain an identification code;
   wherein, in response to receiving the identification code, the processing device is configured to look up the identification code in the look-up table stored in the local database to determine from a respective information link indicator whether or not a link exists for accessing information pertaining to an article of commerce associated with the identification code via the communication network, wherein the processing device determines whether or not the link exists without accessing the communication network.

13. The mobile device of claim 12, further comprising a visual output device for producing visual signals to indicate to a user of the mobile device whether or not the image is associated with an article of commerce for which information pe liaining to the article of commerce is accessible via the communication network.

14. The mobile device of claim 12, further comprising an audio output device for producing audio signals to indicate to a user of the mobile device whether or not the image is associated with an article of commerce for which information pertaining to the article of commerce is accessible via the communication network.

15. The mobile device of claim 12, wherein the look-up table further comprises hyperlinks enabling the communication interface to access information about the respective article of commerce from at least one web page via the communication network.

16. The mobile device of claim 12, wherein the look-up table is further configured to store at least one of descriptions of the plurality of articles of commerce and store advertisement content regarding the plurality of articles of commerce.

* * * * *